US 6,694,126 B1

(12) United States Patent
Van Lente

(10) Patent No.: US 6,694,126 B1
(45) Date of Patent: Feb. 17, 2004

(54) DIGITAL MEMO RECORDER

(75) Inventor: Paul S. Van Lente, Holland, MI (US)

(73) Assignee: Johnson Controls Interiors Technology Corp., Holland, MI (US)

( * ) Notice: Subject to any disclaimer, the term of this patent is extended or adjusted under 35 U.S.C. 154(b) by 491 days.

(21) Appl. No.: 09/613,778

(22) Filed: Jul. 11, 2000

(51) Int. Cl.[7] ................................. H04B 7/00
(52) U.S. Cl. ................ 455/66.1; 455/41.1; 455/412.1; 455/345
(58) Field of Search ............... 455/412, 550.1, 455/412.1, 412.2, 66.1, 344, 345, 41.1, 41.2; 379/67.1, 67, 265; 340/425.5, 825.31, 815.4; 296/97.5

(56) References Cited

U.S. PATENT DOCUMENTS

| 4,362,907 A | * | 12/1982 | Polacsek ............... 455/345 |
| 4,875,229 A | * | 10/1989 | Palett et al. ............ 455/550 |
| 5,172,111 A | * | 12/1992 | Olivo, Jr. .............. 386/126 |
| 5,193,141 A | * | 3/1993 | Zwern ................. 704/200 |
| 5,430,432 A | * | 7/1995 | Camhi et al. ........... 340/438 |
| 5,481,595 A | * | 1/1996 | Ohashi et al. .......... 379/88.27 |
| 5,530,950 A | * | 6/1996 | Medan et al. .......... 379/88.24 |
| 5,668,853 A | * | 9/1997 | Florence et al. ........ 379/67.1 |
| 5,810,420 A | * | 9/1998 | Welling ............... 296/97.5 |
| 6,177,864 B1 | * | 1/2001 | Berberich ............. 340/426 |
| 6,377,793 B1 | * | 4/2002 | Jenkins ............... 455/412 |
| 6,408,232 B1 | * | 6/2002 | Cannon et al. ......... 701/29 |
| 6,420,975 B1 | * | 7/2002 | DeLine et al. ......... 340/815.4 |
| 2002/0121972 A1 | * | 9/2002 | Schofield et al. ....... 340/438 |

* cited by examiner

Primary Examiner—Nay Maung
Assistant Examiner—Tan Trinh
(74) Attorney, Agent, or Firm—Foley & Lardner

(57) ABSTRACT

A digital memo recorder in a vehicle for recording/play-back of messages and tagging the messages for future reference. The digital recorder is microprocessor controlled to allow direct sequential access for playing back messages. An auditory and visual indication reminds a user of stored messages. Vehicle performance characteristics may be stored as message reminders for future reference. A communications medium couples the digital recording device to the various vehicle functions for courtesy retrieval. The communications medium may be both hard-wired and wireless.

27 Claims, 1 Drawing Sheet

DIGITAL MEMO RECORDER

BACKGROUND OF THE INVENTION

This invention relates to memo recorders, and more particularly to a memo recorder in a vehicle for recording/ playback of messages, tagging the messages, and alerting the user as to the status of various vehicle functions.

When a driver of a vehicle is travelling to and from work or if talking on a cellular telephone, errands, appointments, telephone calls, or other actions which require future activity are brought to the attention of the driver. In the past, for recording such items for future reference, a vehicle operator may have carried a memo pad which can be attached to the dashboard and removed for writing notes for such items. In some instances, arm rest consoles may include built-in memo pads or writing surfaces for this purpose. U.S. Pat. No. 4,875,229 discloses a visor mounted telephone and an analog tape answering and recording machine. Such device has the usual complicated controls associated with an analog recorder and does not allow random access to a recorded message.

Recently, portable digital recording devices have become available for recording short messages, such as reminder memos to one's self, and can be conveniently carried in a pocket of the user. Although such devices provide a useful function, they could easily be left behind in pockets of clothing not worn or set aside and left in the office or home. Further, they do not allow for random access to any desired message.

U.S. Pat. No. 5,810,420 entitled "Memo Visor" and which is hereby incorporated by reference discloses a digital voice recorder located within a bezel positioned in a visor for convenient use by the vehicle operator. The bezel is elongated with a record switch and a playback switch in spaced relationship for easy operation. The digital voice recorder is microprocessor controlled to allow direct sequential access for playing back messages.

In spite of the teachings of the above-mentioned patents, there is still a significant need for a memo recorder which is able to record/play back messages and highlight or "tag" selected messages in memory to alert the user at a future time that a message or messages needs to be addressed.

It is therefore a principle object of the present invention to provide a memo recorder in a vehicle for recording/ playback of messages, and tagging the messages for future reference. The tagged messages could be played back automatically and at a later time at the discretion of the user.

It is still another object of the present invention to provide an indication signal to alert the user of a waiting message. The alert indication will exist until the message is played by the user.

It is yet another object of the present invention to provide to the user the status of various vehicle functions such as oil pressure, seatbelt fastening, temperature alert as courtesy alarms to the user.

SUMMARY OF THE INVENTION

The present invention relates to a memo recorder in a vehicle for recording/playback of messages, and "tagging" the messages for future reference. The tagged messages remind the user that a message is awaiting retrieval.

In a preferred embodiment of the invention, the invention includes a digital memo recorder. The digital memo recorder includes a delete switch for deletion of messages and other vehicle communications, and a "tag" switch for marking a message and vehicle communications for future reference. An indicator such as an LED, beeping tone, and/or a combination of both, is used to remind the user of a waiting message.

In an alternative preferred embodiment, the apparatus of the present invention comprises a digital memo recorder connected to a vehicle bus. An indicator such as an LED, beeping tone, and/or a combination of both, is used as an alarm. When a vehicle's ignition is turned on and alternatively, when the ignition is turned off, an audible explanation will automatically key. Accordingly, the status of various vehicle parameters such as battery charge, oil pressure, and seatbelt warning are available to the user through the indicator of the digital memo recorder.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

The following description of the preferred embodiment concerning a digital memo recorder is merely exemplary in nature and is not intended to limit the invention or its application or uses. Moreover, while the present invention is described in detail below with reference to use with an automotive vehicle visor, it will be appreciated by those skilled in the art that the present invention is clearly not so limited to vehicle visors and may be used with other types of devices as well.

Figure 1:
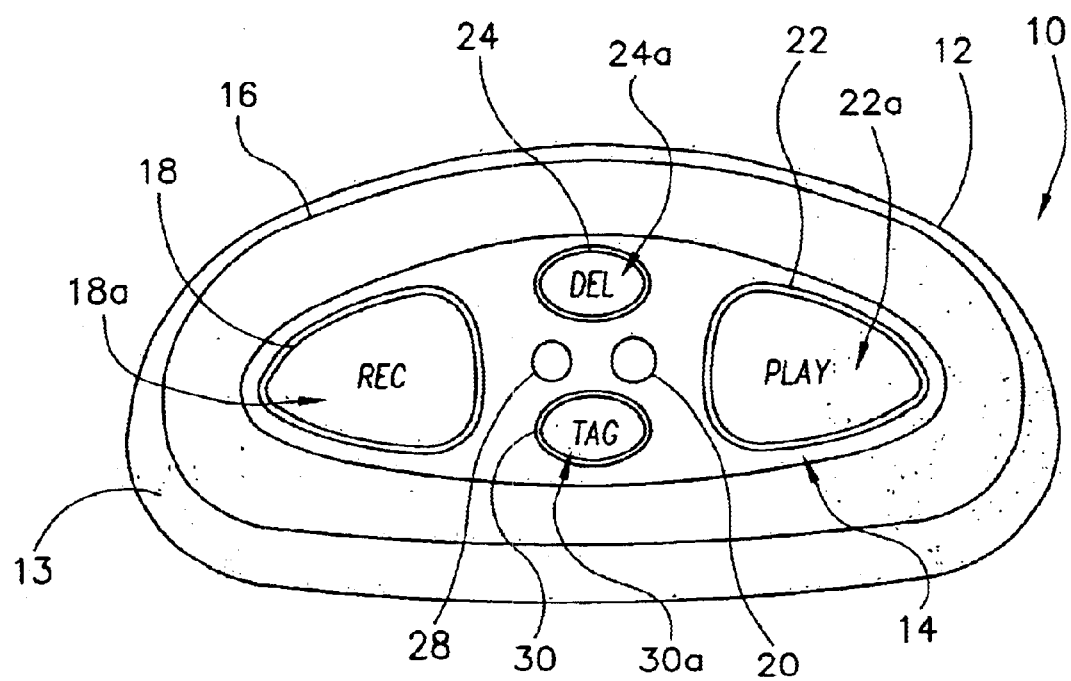
FIG. 1 is a simplified perspective view of a digital memo recorder in accordance with a preferred embodiment of the present invention.

Referring to FIG. 1, a vehicle subsystem is shown generally designated by the number 10. While the vehicle subsystem 10 may be a vehicle visor 12, it will be appreciated that the vehicle subsystem 10 may be other suitable components such as a vehicle instrument panel, a vehicle console, an armnrest, a rearview mirror, or other suitable vehicle interior components. The visor 12 includes a digital recorder 14 integrated within the visor body 13 and located in the upper right hand corner of, for example, the driver's side visor. The digital recorder 14 includes a bezel 16 for receiving and supporting the user interface controls including a record push button switch 18, which includes a microphone indicia 18a printed on the face thereof for illustrating to the user that the switch 18 can be used to record messages and storing the messages in a memory device 38. Also incorporated within the digital recorder 14 is a center located microphone/speaker 20, which can be a relatively small ceramic device which is commercially available. Further, the bezel 16 supports a play-back push-button switch 22 including a speaker indicia 22a thereon for indicating to the user the fact that the switch 22 is used for playing back existing messages.

The bezel 16 further supports a delete switch 24 having indicia such as a line 24a drawn therein indicating that the switch 24 is to be used for deleting prerecorded messages. Additionally, a tag switch 30 is located at a predetermined location on the digital recorder 14. An indicia 30a indicates to the user that the switch 30 is to be used to mark or tag preselected messages to be highlighted for future reference. The digital recorder 14 further includes a multicolored indicator 28 which can be a multicolored LED indicating recording, play-back, memory status, and tag messages of the digital recording device 14 in accordance with the device's operation.

To record a message, the record switch 18 is momentarily pressed and the microphone speaker 20 chirps and the indicator 28 illuminates red. The operator then speaks the messages, the length of which is only limited by the memory selected for the recorder 14. After recording a message, the record switch 18 is again momentarily pressed to stop the recording. The microphone/speaker 20 chirps and the indicator 28 turns off. When it is desired to tag a message, the user depresses the tag switch 30 which cause the memory of the digital recorder 14 to store a parameter in a memory device 38. When a vehicle's ignition is turned on and alternatively, when the ignition is turned off, the messages tagged are automatically played back. Alternatively, the tag switch 30 may be depressed to retrieve a tagged message from memory 38. Depressing the tag switch 30 will play back a respective tagged message which may be deleted by depressing the delete switch 24 after play back or during play back. If more than one tagged message exists in memory 38, depression of the tag switch 30 will skip to the next in succession for play-back or deletion.

To play a previously recorded message, the operator momentarily presses the play switch 22, the microphone/speaker 20 chirps and the green portion 28 of the indicator 28 blinks. The first recorded message plays and the indicator 28 turns off. If more than one message has been recorded, the operator again momentarily presses the play switch 22 and repeats the process to play back all of the messages. If no messages remain, pressing the play switch 22 again returns the play-back to the first message. If the play switch 22 is pressed during message play-back, the system skips the next message and begins play-back. An amber indicator 28 may be used to show that no messages are recorded when attempting to play back any messages or that the memory is full when attempting to record a message.

Tagged messages are automatically played when the ignition of a vehicle is turned on, and when the ignition is turned off. The tagged message(s) will continue to be played until acknowledged. Acknowledgement of the tagged messages may be actuation of the tag switch 30, play switch 22, or delete switch 24. A commercially available voice simulation may be used.

Figure 2:
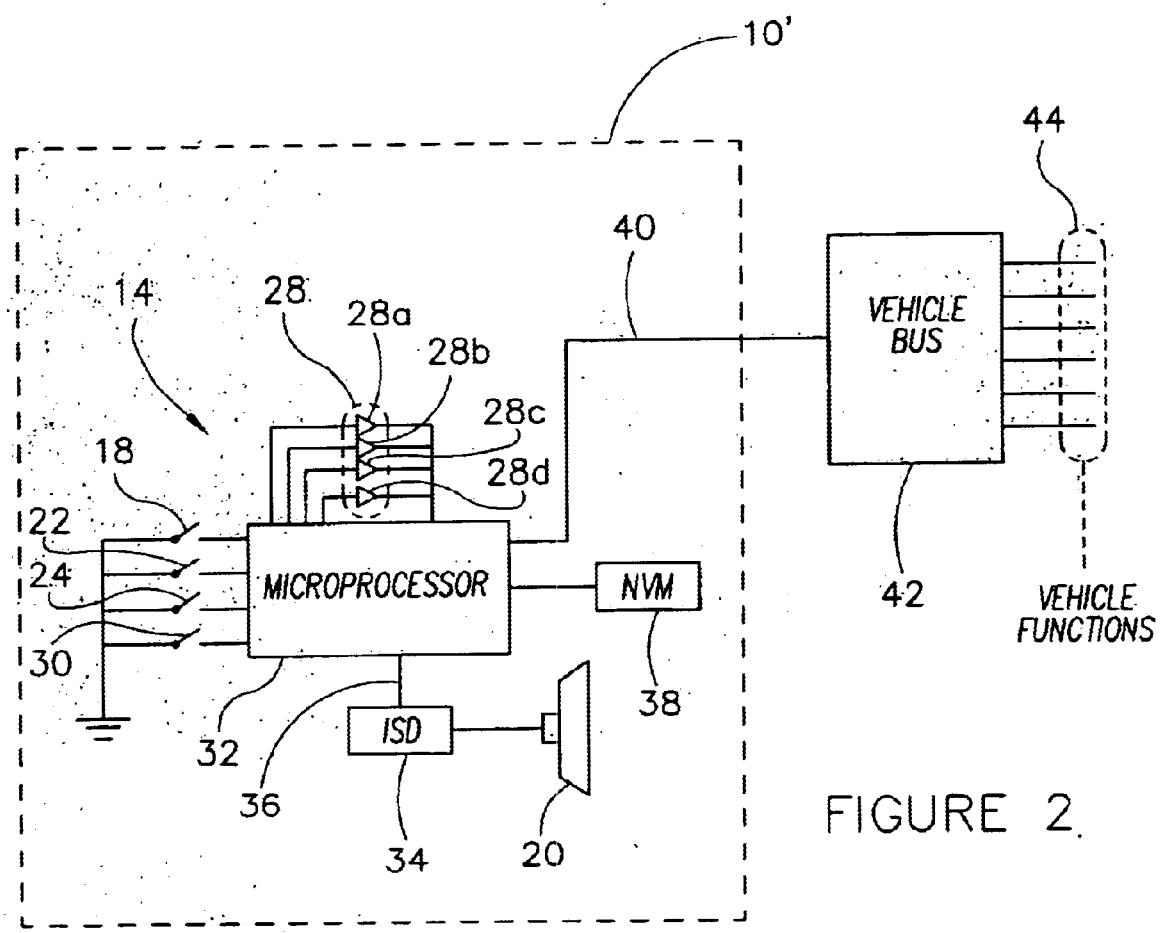
FIG. 2 is an electrical circuit diagram in block and schematic form of the circuit of a preferred embodiment of the present invention.

Referring to FIG. 2, another embodiment of the vehicle subsystem of the present invention is described which is generally designated by the numeral 10. In this embodiment, the same reference numerals which are used to identify components which are similar to elements described in connection with the first embodiment of the present invention shown in FIG. 1. The digital recorder 14 includes a microprocessor 32 programmed to facilitate use of the operation of the recorder 14. Coupled to the input of the microprocessor 32 is the record switch 18, the delete switch 24, the play-back switch 22, and the tag switch 30. The switches 18, 22, 24, and 30 function in a manner similar to that associated with the corresponding switch of the first preferred embodiment. The microprocessor 32 is coupled to a voice recording chip 34 such as an ISD 1000 AP and for such purpose an address and control line 36 intercouples the microprocessor 32 with the ISD circuit (not shown).

The microprocessor 32 is also coupled to a non-volatile memory 38 which stores messages received temporarily stored by the ISD circuit (not shown) and is controlled by the microprocessor 32 to provide random access to such prerecorded, stored messages. The ISD circuit (not shown) is coupled to the combined microphone/speaker 20 for receiving voice information to be recorded and for playing back such recorded messages.

The microprocessor 32 is coupled to a four color indicator 28 including a red indicator 28a indicating that the device is in a recording mode, a green indicator 28c indicating that the device is in a playback mode, an amber indicator 28d providing notification to the user that no messages are recorded when attempting to play back any messages or that the memory is full when attempting to record a message, and, a white indicator 28b indicating that a tag message has been marked for future retrieval.

A communications medium 40 couples the digital recorder 14 to a vehicle bus 42. The vehicle bus 42 contains a plurality of connections from vehicle sensors 44 such as seatbelt fastening sensor, windshield washer fluid level sensor, door ajar sensor, and fuel level sensor. Accordingly, information from the various vehicle sensors 44 may be relayed to the digital recorder 14 via the communications medium 40 to provide courtesy indications to the user. For example, when a seatbelt is not fastened, the indicator 28 may have a combination of flashing lights, a beeping tone, or a combination of both to indicate to the user that a seatbelt needs to be fastened. Additionally, auditory messages indicating the sensed vehicle performance characteristics that have been tagged, may be played when the tag switch 30 is actuated, the vehicle driver's door is opened, the ignition key is placed in the vehicle ignition, and/or the vehicle ignition is activated. The message will continue to play until acknowledged by actuation of the tag switch 30, play switch 22, or delete switch 24. A commercially available voice simulation may be used.

The microprocessor circuit is powered utilizing conventional power supply circuitry (not shown) and is coupled to the battery supply line (not shown) of the vehicle with a non-volatile memory 38 serving to retain the messages in memory even if the battery supply line (not shown) is disconnected, either inadvertently or, as in some vehicle models, after a predetermined period of time. Information from the vehicle sensor 44 may be supplied to the user of the vehicle either before the ignition switch (not shown) of the vehicle is activated or after starting the vehicle.

The communications medium 40 may be electrical wiring or a wireless communication. A commercially available wireless communications medium is the Bluetooth technology currently in use by Nokia and Motorola. The technology is based on a short-range radio link, built into a microchip facilitating protected ad hoc connections for stationary and mobile communication environments. Bluetooth technology allows for the replacement of cables that connect one device to another with one universal short range radio link.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A vehicle subsystem for recording, playing back, and tagging messages by a user of a vehicle, the vehicle subsystem comprising a digital recorder including:

a record switch for causing the recorder to record messages;

a play-back switch for causing the recorder to play back recorded messages;

a delete switch for deletion of messages form the recorder;

a tag switch for marking a message for future reference; and an indicator to alert the user to the status of messages that are marked by activation of said tag switch.

2. The vehicle subsystem according to claim 1, wherein said record and playback switches include indicia thereon identifying their respective control functions.

3. The vehicle subsystem according to claim 1, wherein the recorder includes a speaker/microphone located at a predetermined location between the play-back and record switches.

4. The vehicle subsystem according to claim 1 wherein the vehicle has a vehicle bus electrically communicating with a plurality of vehicle sensors, said digital recorder further includes a communications medium to interconnect said digital recorder to a vehicle bus for communications of vehicle sensors.

5. The vehicle subsystem according to claim 4, wherein said communications medium includes wireless communications technology.

6. The vehicle subsystem according to claim 5, wherein said communications medium includes Bluetooth wireless communications technology.

7. The device of claim 6, further comprising a record switch for causing the device to record user messages, the recorded messages being stored in the digital storage device, wherein the tag switch is configured to mark the recorded user messages for future reference.

8. The vehicle subsystem according to claim 4, wherein the communications medium includes hard wire between said digital recorder and said vehicle sensors.

9. The vehicle subsystem according to claim 1, further comprising a visor having a visor body and a bezel, said bezel being operable to secure said digital recorder to said visor body.

10. A vehicle subsystem for recording and playing back messages by a user, said vehicle subsystem comprising:

a visor having a visor body;

a digital recorder operable to record and play back messages from a user, said digital recorder including:

a plurality of switches operable to control recording and playing back of messages by a user;

a tag switch for marking particular messages by the user for future reference;

a memory device for storing messages as well as and whether the messages have been marked by actuation of said tag switch;

an indicator for identifying to the user whether the memory device contains messages that have been marked by actuation of said tag switch; and a member for mounting said digital recorder to said visor body.

11. The vehicle subsystem according to claim 10, wherein said plurality of switches include indicia thereon identifying their respective control functions such as record and playback.

12. The vehicle subsystem according to claim 10, wherein said digital recorder includes a speaker/microphone located at a predetermined location between the play-back and recorder switches.

13. The vehicle subsystem according to claim 10, wherein said vehicle subsystem has a vehicle bus and a plurality of vehicle sensors, said recorder further includes a communications medium to interconnect said digital recorder to a vehicle bus for communications of vehicle sensors.

14. The vehicle subsystem according to claim 11, wherein said communications medium includes wireless communications technology.

15. The vehicle subsystem according to claim 14, wherein said communications medium includes Bluetooth wireless communications technology.

16. The device of claim 15, further comprising an indicia that indicates that the tag switch is to be used to tag messages.

17. The device of claim 15, further comprising a housing configured to be mounted to a vehicle interior, the tag switch being located within the housing.

18. The device of claim 15, further comprising:

a delete switch for deleting messages; and an indicator to alert the user to a status of a message that has been marked by activation of the tag switch.

19. The vehicle subsystem according to claim 13, wherein said communications medium includes hard wire between said digital recorder and said vehicle sensors.

20. The vehicle subsystem according to claim 10, wherein said recorder includes a bezel for securing said digital recorder to the vehicle subsystem.

21. A vehicle subsystem for recording and playing back messages by the user of the vehicle, said vehicle subsystem including a digital recorder, said vehicle subsystem performing the steps of:

recording a message of the user upon actuation of a switch communicating with the digital recorder;

tagging said message by user to facilitate recall of the message from the digital recorder by the user;

storing said message and a parameter indicating that the message has been tagged in a memory device; and controlling an indicator in communication with said digital recorder in response to whether a message that has been tagged by the user resides in said memory device.

22. The vehicle subsystem for recording and playing back messages by a user as set forth in claim 21, further comprising the additional step of removing a message and a parameter indicating that the memory device contains a tagged message from said memory device.

23. The vehicle subsystem for recording and playing back message by a user as set forth in claim 21, wherein said digital recorder further includes a tag switch, said step of tagging said messages by the user includes the step of actuating said tag switch by the user.

24. The vehicle subsystem for recording and playing back messages by a user as set forth in claim 21, wherein said digital recorder communicates with a sensor located within the vehicle which measures vehicle performance characteristics, said vehicle subsystem performing the additional step of controlling said indicator in response to the output of said sensor.

25. The vehicle subsystem for recording and playing back messages by the user as set forth in claim 21, wherein said indicator provides visual indication of whether a message that has been tagged resides in said memory device.

26. The vehicle subsystem for recording and playing back messages by the user as set forth in claim 21, wherein said indicator provides an auditory indication of whether a message that has been tagged resides in said memory device.

27. The vehicle subsystem for recording and playing back messages by the user as set forth in claim 21, wherein said indicator provides an auditory and visual indication of whether a message that has been tagged resides in said memory device.

* * * * *